G. L. SMITH.
PIPE, SEWER, AND CONDUIT.
APPLICATION FILED MAR. 29, 1910.
1,008,745.
Patented Nov. 14, 1911.
2 SHEETS—SHEET 1.
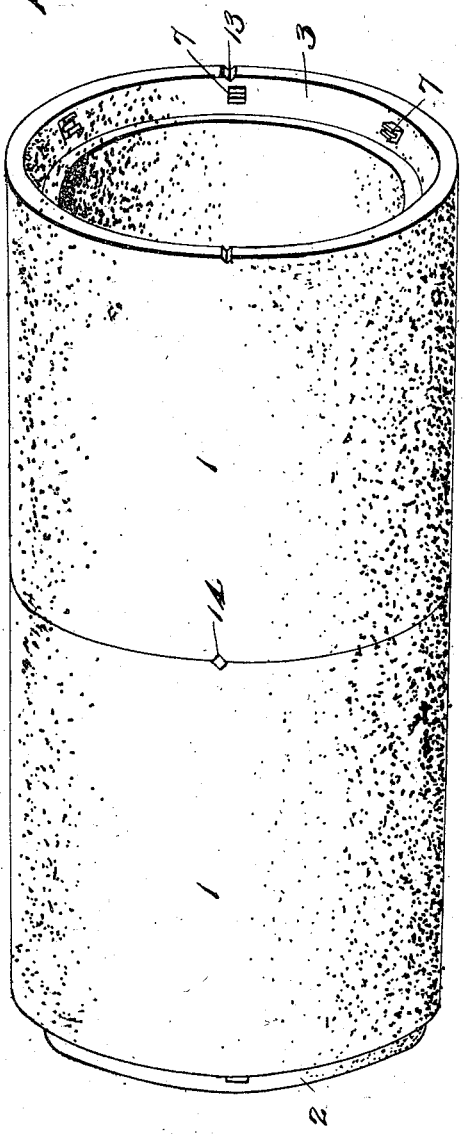
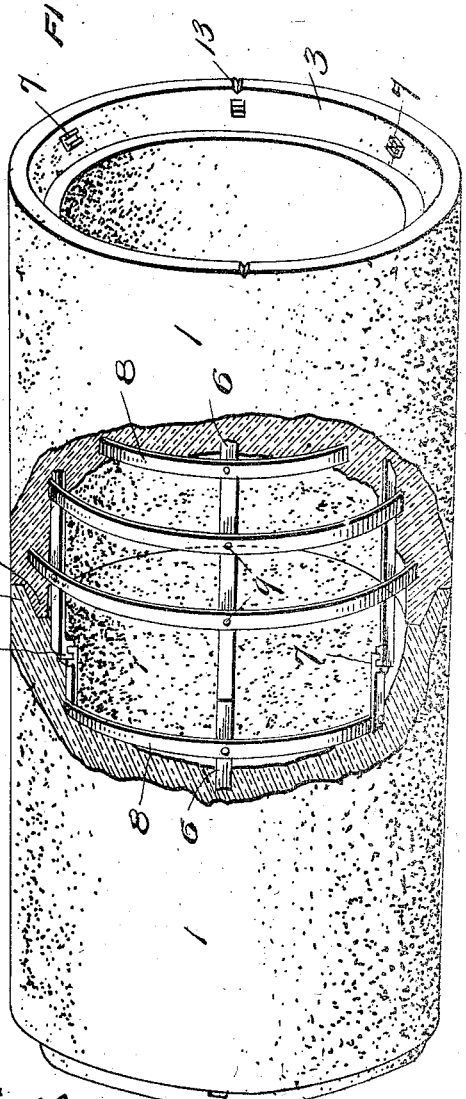
WITNESSES
INVENTOR
Godfrey L. Smith
Attorney G. L. SMITH.
PIPE, SEWER, AND CONDUIT.
APPLICATION FILED MAR. 29, 1910.
1,008,745.
Patented Nov. 14, 1911.
2 SHEETS—SHEET 2.
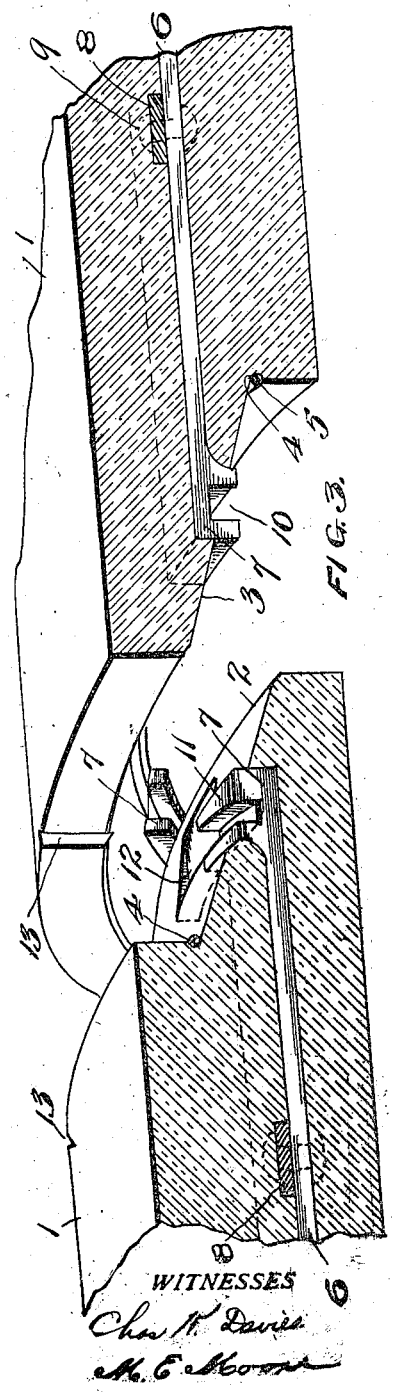
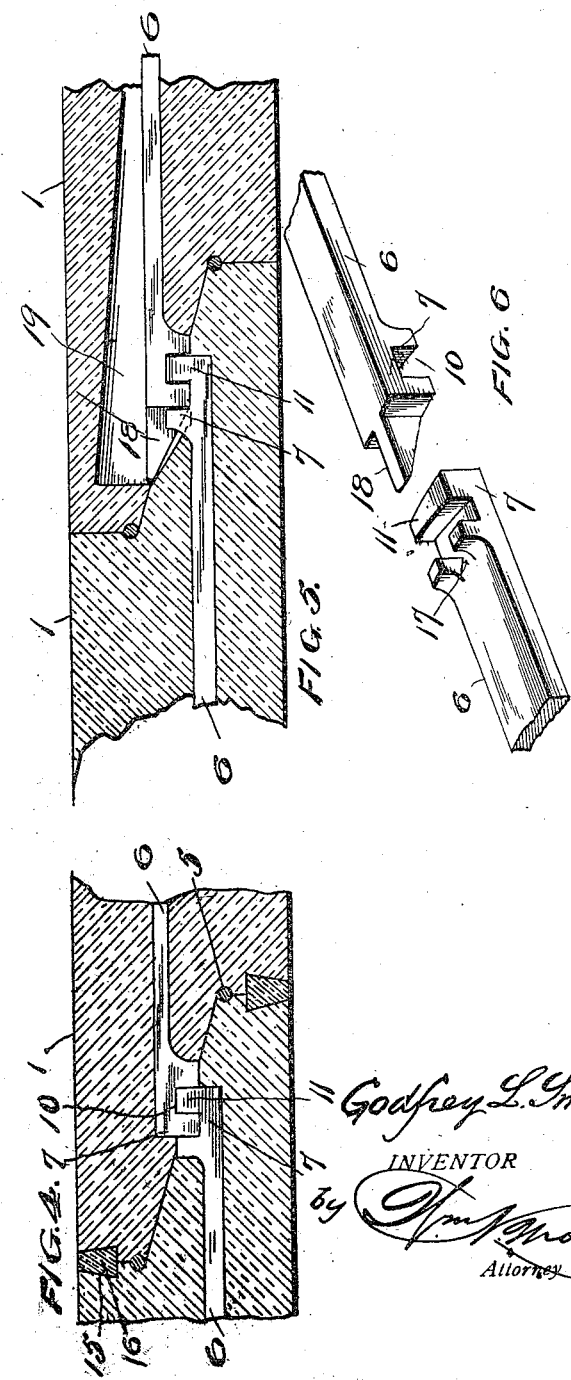

UNITED STATES PATENT OFFICE.

GODFREY LEWIS SMITH, OF NEWPORT NEWS, VIRGINIA.

PIPE, SEWER, AND CONDUIT.

1,008,745.

Specification of Letters Patent. Patented Nov. 14, 1911.

Application filed March 29, 1910. Serial No. 552,168.

*To all whom it may concern:*

Be it known that I, GODFREY LEWIS SMITH, a citizen of the United States, residing at Newport News, in the county of Warwick and State of Virginia, have invented certain new and useful Improvements in Pipes, Sewers, and Conduits, of which the following is a specification.

My invention relates to improvements in pipes, sewers, and conduits, and particularly to pipes and conduits formed from cement, clay or any other material adapted to be molded into the desired form and which is not in itself of sufficient tensile strength to withstand the great strains to which it is liable to be subjected and which therefore requires metal reinforcement.

The object of my invention is the provision of an improved form of pipe made in a series of molded sections, said sections being of such size as to be transportable and being each provided with a bell portion at one end and a spigot at the other adapted to be readily placed in interlocking position, and to brace said sections against both internal and external pressure and increase the tensile strength of the pipe I have inserted therein a network of metal.

A further object of my invention is the provision of a reinforced molded sectional pipe which shall be provided with means for readily locking the parts together to form a practically unitary structure which can be immediately used without the necessity for delaying to allow the parts thereof to dry or settle into position.

To attain the desired objects, my invention comprises a sectional pipe having interlocking ends and provided with reinforcing means located centrally of the thickness of the pipe, certain of said reinforcing means projecting from the end of the main portion of the section and being adapted to engage similar projections on the adjacent section for locking them in tight engagement, said sections each being provided with gaskets for insuring a tighter joint therebetween.

In the drawings I have illustrated the principles of my invention and have shown views of pipes constructed in accordance with the said principles, but it will be understood that I may make numerous changes in the details of construction thereof without departing from the spirit of the invention.

Figure 1 represents a perspective view of a portion of pipe. Fig. 2 represents a similar view with a portion broken away to illustrate more clearly the construction of the pipe and the method of locking the sections together. Fig. 3 represents an enlarged view partly in section illustrating in detail the locking means about to be locked together. Figs. 4 and 5 represent fragmentary enlarged sectional views illustrating the sections as they appear when locked together, Fig. 5 showing a modified form of locking members, and Fig. 6 represents a perspective view of the two locking ends of the modified form shown in Fig. 5.

The numeral 1 designates the cement pipe sections, said sections being formed with the spigot 2 on one end and the bell 3 in the other, said bell being adapted to receive the spigot of the adjacent section, and formed at each end of the sloping face of said bell and spigot portions of the pipe is a recess 4, said recesses being adapted to engage therein the gasket 5, said gasket being of slightly larger size than the recesses and being adapted to be compressed therein as the sections are forced together, thus forming a liquid tight joint between said sections.

To brace the various sections I form therein and have disposed about centrally of the thickness of the side of the pipe a series of longitudinally disposed metal bars 6 each terminating in a block 7 which projects from the face of the pipe, said bars being so arranged that the blocks project from the outer face of the bell portion of the pipe and from the inner face of the spigot portion of the pipe, as clearly shown in Fig. 3. To further brace the pipe I have located therein surrounding and bearing against the bars 6 a series of metal bands 8 having their ends secured together by rivets or bolts 9, said rivets also being employed if desired to secure the bands to the bars 6.

In the preferred form of the invention as shown in Figs. 3 and 4, it will be observed that I have formed in the blocks 7 a groove 10, the groove 10 in the block of the bell end of the pipe extending at an angle to the axis of the pipe and being of size to receive the toe 11 formed on the other block by its groove 10, said block on the spigot portion also making an angle with the axis of the pipe and the front edges of the grooves in the blocks of the bell, and spigot portions of the pipe lying in alinement with each other when the sections of the pipe are forced into interlocking engagement.

To secure the sections of pipe together, I first wedge one section in position in the trench and place the next in an endless sling of suitable material which passes over a sheave, the weight of the pipe thus being supported by the sling while the pipe can be readily revolved on account of the sheave. I then bring the section so supported on a level with the wedge section when the bell of the one will receive the spigot of the other, suitable recesses 12 being formed adjacent each of the blocks of one section to receive the blocks of the other. The two sections are now forced into interlocking engagement, when toes 11 of one section will be brought into alinement with the grooves 10 of the block of the other section. By any suitable mechanism I rotate the section in the sling until the two sections, by the wedging action exerted by the blocks on account of the angle of the grooves, are forced tightly against the gaskets 5, thus forming a watertight joint. It will be understood that said gaskets may be formed of any suitable material such as rubber, tarred hemp, paraffined cotton or the like, and by varying the size of the gaskets a rigid or flexible joint may be formed, the gaskets being made either so small that the sections and blocks will at all points make tight engagement with each other or being larger so that there will be a little play between the ends of the one set of blocks and the rear face of the grooves of the other, the sections being prevented from spreading apart while in the case of the slight sinking of one of the sections the gasket will be compressed and the toes 11 will move to bear against the rear of the grooves, thus permitting the pipe to adjust itself.

It will be observed that I provide in the ends of the sections one or more radial grooves 13, there being coincident grooves on the faces of the adjacent sections, and after the sections are in position I drive into said grooves the pins 14 which prevent independent rotative movement of the sections.

While the gaskets are especially adapted for use with smaller pipes they may also be employed in larger ones, but in the interest of economy I prefer to use with larger pipes a cement or mortar joint, the meeting edges of the two pipes having formed therein recesses which together provide the annular recesses 15 tapering toward the face of the pipe, when it is possible for a person to enter the pipe one of said recesses 15 being provided on the inside to receive the filler 16, but if the size or position of the pipe prohibits the filling of an internal recess I then use only the exterior one, while it will be understood that if desired I may, as shown in Fig. 4 employ both gaskets and filler.

In Figs. 5 and 6 I have illustrated a modified form of my invention adapted for use when it is inexpedient to rotate the sections to lock them as is necessary with my preferred form, or when the pipes can be conveniently rotated but a slight amount, as is the case with pipes having a flat base. In this form of the invention I dispense with the large recesses 12 and secure the pipes by a spring lock. In this form, the spigot member is substantially the same as in my other form, the only difference being that I form in the rear of the block thereof the groove 17 while on the end of the block of the bell member I provide a projecting cam lug 18 adapted when the sections are locked to fit into the said groove, the groove 17 being considerably wider than the thickness of the lug. Formed in the bell portion above or exterior to the bars are recesses 19, and in operation the two sections having been placed in interlocking position I force them toward each other, the cam lug bearing against the toe 11 of the other block and riding up thereon and the end of the bar being sprung up into the recess 19, forcing the pipes together until the toe portion of the bar bearing the lug drops into the groove 10 of the block in the bell, when the parts are locked together as shown in Fig. 5. If desired I may then slightly rotate the members to wedge them more tightly together as is done with the other form of my invention, the lug 18 moving in the groove 17 until it strikes the side thereof.

From the foregoing description taken in connection with the drawings the construction of my pipe and the method of securing the sections together will be readily understood and it will be apparent that I have provided a strong, simple, cheap and durable pipe braced against both internal and external pressure, which is provided with longitudinal braces terminating in interlocking portions for securing the sections together, said bracing and locking means being entirely within the pipe and the joints of the pipe interior and exterior to said means being made waterproof to prevent the oxidation or other deterioration of said means, and that I provide a pipe which will prove practical and efficient in every particular and will fulfil the desired objects.

I claim:

1. A concrete pipe composed of a plurality of sections having interlocking bell and spigot portions at their ends, said sections each having a plurality of longitudinally disposed bracing members formed therein, annular bands in the pipe sections passing around the various longitudinal members for binding the same together, and interlocking male and female portions formed on opposite ends of the longitudinal members and projecting inward from the bell and outward from the spigot end for engagement with the corresponding member of the adjacent section to lock said sections together.

2. In concrete construction, a metal framework comprising a series of annular bands, longitudinally disposed members secured to said bands and forming in conjunction therewith a tubular frame-work, a concrete facing on the interior and exterior of the frame-work to transform the same into a solid-walled pipe, said pipe having a spigot portion at one end and a bell portion at the other, and the longitudinal members each having a jaw portion projecting inward from the bell end of the pipe and a jaw on the other end projecting outward radially from the spigot end of the pipe, said jaws of the bell end making interlocking engagement with the jaws of the spigot end of the adjacent pipe section for locking them together.

In testimony whereof I affix my signature, in presence of two witnesses.

GODFREY LEWIS SMITH.

Witnesses:
 GEO. A. PARKER,
 L. F. BOGGS.